United States Patent
Karidis et al.

(10) Patent No.: US 6,741,455 B2
(45) Date of Patent: May 25, 2004

(54) FOLDING KEYBOARD WITH AUTOMATIC STATE INITIATOR

(75) Inventors: John Peter Karidis, Ossining, NY (US); Russell Alan Resnick, Raleigh, NC (US); Randall Scott Springfield, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 133 days.

(21) Appl. No.: 10/008,617

(22) Filed: Dec. 3, 2001

(65) Prior Publication Data

US 2003/0103323 A1 Jun. 5, 2003

(51) Int. Cl.[7] ................................................. G06F 1/16
(52) U.S. Cl. ...................... 361/680; 400/472; 248/223.1
(58) Field of Search ................................ 361/674–686; 245/223.1–273.3; 400/472, 478, 489, 492; 345/109, 168

(56) References Cited

U.S. PATENT DOCUMENTS

| | | | |
|---|---|---|---|
| 4,496,200 A | * | 1/1985 | Hagstrom et al. ....... 312/223.3 |
| 5,267,127 A | | 11/1993 | Pollitt |
| 5,628,482 A | | 5/1997 | Iravantchi et al. |
| 5,687,058 A | * | 11/1997 | Roylance .................... 361/680 |
| 5,712,760 A | * | 1/1998 | Coulon et al. .............. 361/680 |
| 5,995,025 A | * | 11/1999 | Sternglass et al. .......... 361/680 |
| 6,081,207 A | * | 6/2000 | Batio ......................... 361/680 |
| 6,174,097 B1 | * | 1/2001 | Daniel ........................ 400/472 |
| 6,215,419 B1 | * | 4/2001 | Leman ........................ 341/22 |
| 2002/0063690 A1 | * | 5/2002 | Chung et al. ............... 345/168 |

* cited by examiner

Primary Examiner—Lisa Lea-Edmonds
(74) Attorney, Agent, or Firm—Raman N. Dewan; Joseph P. Lally; Martin J. McKinley

(57) ABSTRACT

A folding keyboard for a data processing system having two or more keyboard sections, keys attached to the keyboard sections, and a keyboard housing for receiving the keyboard sections. The keyboard may be configured to assume an extended position in which each of the keyboard sections is extended, and may be further configured to assume a second position in which each of the keyboard sections are collapsed. The keyboard may be further configured to transmit in response to a change in the extension state of the keyboard, a state signal to the data processing system for directing the data processing system to transition between a wake mode and a sleep mode. The keyboard may include one or more connectors attached to the keyboard sections for transitioning the keyboard from the extended position to the collapsed position, may include one or more rollers for facilitating movement of the keyboard between the extended position and the collapsed position, and may include one or more locks for selectively maintaining the keyboard in the extended position or the collapsed position.

39 Claims, 5 Drawing Sheets

FOLDING KEYBOARD WITH AUTOMATIC STATE INITIATOR

BACKGROUND

1. Field of the Present Invention

The present invention generally relates to the field of computer keyboards and more particularly to a folding keyboard with an automatic state initiator.

2. History of Related Art

Computer systems including personal digital assistants, notebook computers, laptop computers, personal computers, server systems, and enterprise systems are universally prevalent in a vast assortment of business, scientific, commercial, and home applications. Each of these computer systems utilizes a form of input device for receiving data from the user; with keyboards being the most prevalent form for such devices.

Keyboards typically have an elongated rectangular form with alphanumeric keys and special control keys appropriate to the data processing system arranged horizontally in parallel rows and staggered columns on the face of the keyboard. In addition to the special control keys, other keyboards include integrated mouse pads for controlling the movement of the cursor and for selecting various icons in operating systems utilizing graphical user interfaces.

In an effort to reduce the space occupied by the monitor and keyboard (i.e., footprint), monitor and data processing system manufacturers have taken to designing desktop monitors and data processing systems with space underneath them in order for the user to move the keyboard underneath when not in use. It would be beneficial if monitor and data processing system design could be independent of addressing keyboard storage issues or if the space required for accommodating keyboards could be minimized. Further, while data processing systems are configured to enter a power saving "sleep" mode after a predetermined time period has elapsed in which no activity on the keyboard or mouse pad is detected, it remains difficult, if not cumbersome for a user to selectively direct a data processing system to enter a power saving sleep mode.

Accordingly, it is highly desirable to provide for a keyboard that, when not in use, occupies a smaller footprint and that can direct the data processing system to enter into a sleep mode or a wake mode in response to the use state of the keyboard.

SUMMARY OF THE INVENTION

The problems identified above are in large part addressed by a keyboard for a data processing system designed to selectively assume an extended position or a space-saving, collapsed position and further designed to generate a state signal for directing the data processing system to transition between a wake mode and a sleep mode in response to a change in the extension state of the keyboard.

Briefly and in general terms, a folding keyboard for a data processing system according to one embodiment of the invention includes two or more keyboard sections, keys attached to the keyboard sections, and a keyboard housing for receiving the keyboard sections. The keyboard is typically configured to assume a first position in which the keyboard sections are extended, and is further configured to assume a second position in which the keyboard sections are collapsed. In one embodiment, the keyboard would include one or more connectors attached to the keyboard sections for transitioning the keyboard from the extended position to the collapsed position. The keyboard may further include rollers for facilitating movement of the keyboard between the extended position and the collapsed position.

In another embodiment, the keyboard includes a locking mechanism for selectively maintaining the keyboard in the extended position or the collapsed position. The keyboard is preferably configured to transmit in response to a change in the extension state of the keyboard, a state signal to the data processing system for directing the data processing system to transition between a wake mode and a sleep mode. In one embodiment, the keyboard would include a state switch for generating the state signal to the data processing system.

Other aspects and advantages of the present invention will become apparent from the following detailed description when taken in conjunction with the accompanying drawings, illustrating by way of example the principles of the present invention.

BRIEF DESCRIPTION OF THE DRAWINGS

Other objects and advantages of the invention will become apparent upon reading the following detailed description and upon reference to the accompanying drawings in which.

Figure 1:
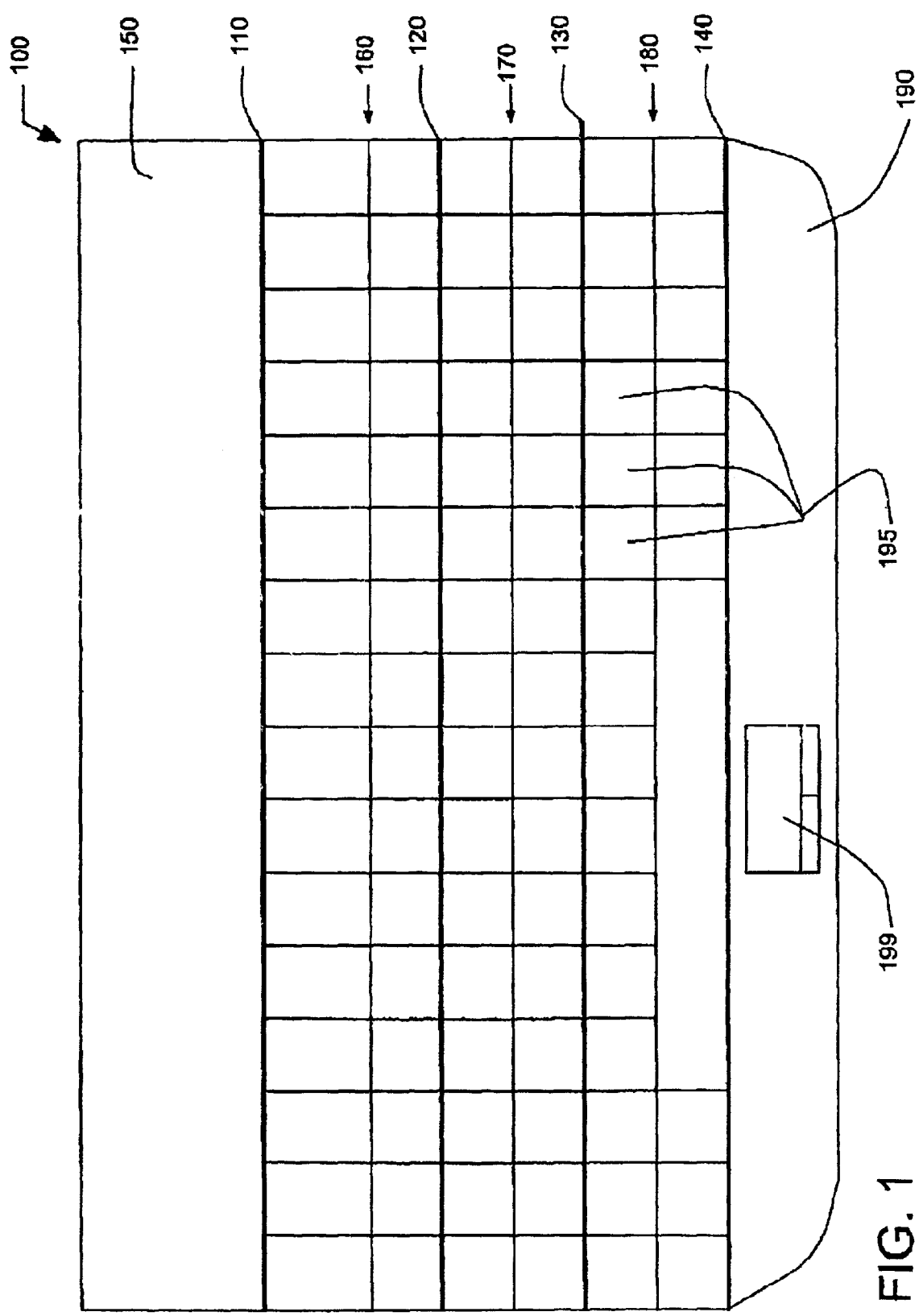
FIG. 1 is a top plan view of a keyboard according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

As shown in the drawings for purposes of illustration, the present invention contemplates a keyboard for a data processing system, the keyboard being designed to assume an extended position or a space-saving, collapsed position. For purposes of clarity, the position of the keyboard (i.e., extended position, collapsed position, or a position between the two) is hereinafter referred to as the "extension state of the keyboard." The keyboard is further designed to generate a state signal for directing the data processing system to transition between a wake mode and a sleep mode in response to a change in the extension state of the keyboard. Throughout the description and the drawings, elements which are the same will be accorded the same reference numerals.

Figure 2:
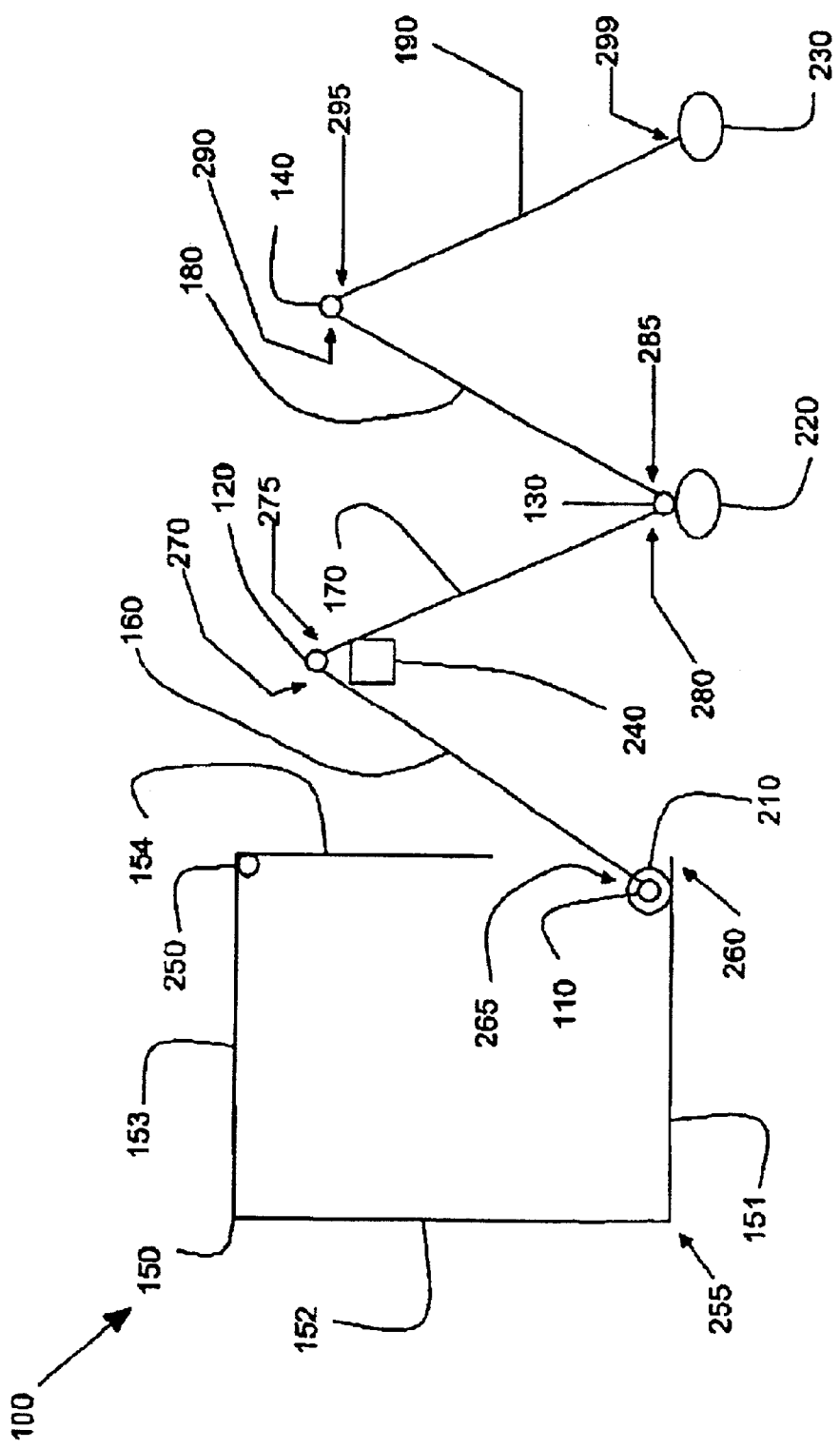
FIG. 2 is a side plan view of a keyboard according to one embodiment of the present invention depicting the keyboard in a position between an extended position and a collapsed position.

Turning now to the drawings, FIG. 1 and FIG. 2 depict a top plan view and a side plan view, respectively, of a keyboard 100 according to one embodiment of the invention. In the depicted embodiment, keyboard 100 includes a keyboard housing 150 and a set of keyboard sections 160, 170, 180, and 190, respectively. Keys 195 are connected to one or more of the keyboard sections. In the depicted embodiment, keys 195 are connected to keyboard sections 160, 170, and 180 and a palm rest having mouse pad 199 is included in keyboard section 190.

Keyboard housing 150 may be suitably sized and shaped for receiving one or more of keyboard sections 160, 170, 180, and 190. In the depicted embodiment, keyboard housing 150 includes a mounting plate 151, a back plate 152, a top plate 153, a front plate 154, and a slider 210 operatively coupled to mounting plate 151. Front plate 154 is movably attached to top plate 153 by way of a suitable connector so as to selectively permit front plate 154 to be moved to (and in an alternative embodiment, remain in) an open position in order to allow keyboard housing 150 to receive keyboard sections 160, 170, 180, and 190 when keyboard 100 is in the collapsed position. In the depicted embodiment, the connector is implemented with a hinge 250.

Keyboard housing 150 is movably attached to the set of keyboard sections by way of a suitable connector so as to permit keyboard housing 150 to receive the set of keyboard sections. In the depicted embodiment, the connector is implemented by a hinge 110 and slider 210. Hinge 110 connects a trailing edge 265 of keyboard section 160 to slider 210. Slider 210 is operatively coupled to mounting plate 151 so as to permit trailing edge 265 of keyboard section 160 to travel between a front edge 260 and a back edge 255 of mounting plate 151.

While mounting plate 151 is shown in the depicted embodiment to be the bottom of keyboard housing 150, it is to be understood that any plate of keyboard housing 150 including side plates (which are not depicted) may be utilized as the mounting plate for connecting slider 210. Further, it is to be understood that one or more slider(s) 210 may be implemented along the trailing edge 265 of keyboard section 160 to facilitate the movement of trailing edge 265 between the front edge 260 and a back edge 255 of mounting plate 151.

Keyboard sections are movably attached to one another by way of suitable connectors so as to permit keyboard 100 to assume a first position in which each of the keyboard sections 160, 170, 180, and 190 are extended from keyboard housing 150 (as depicted and described in more detail in FIG. 4 below) and to assume a second position in which each of the keyboard sections are collapsed and contained within keyboard housing 150 (as depicted and described in more detail in FIG. 3 below). As depicted in the present embodiment, leading edge 270 of keyboard section 160 is movably attached to trailing edge 275 of keyboard section 170, leading edge 280 of keyboard section 170 is movably attached to trailing edge 285 of keyboard section 180, and leading edge 290 of keyboard section 180 is movably attached to trailing edge 285 of keyboard section 190 by way of suitable connectors. In the depicted embodiment, the connectors are implemented with a hinge 120, a hinge 130, and a hinge 140, respectively. Each of hinge 110, hinge 120, hinge 130, and hinge 140 may (as depicted) run the length of front edge 260 of keyboard housing 150 and the length of the trailing edges and the leading edges of the keyboard sections 160, 170, 180, and 190, respectively. Typically, keys 195 are (as depicted) arranged in parallel, horizontal rows on keyboard sections 160, 170, and 180 in order to facilitate placement and operations of hinges 120, 130, and 140 so as to permit adjacent keyboard sections to be folded horizontally along a line between adjacent rows of the keys.

In alternative embodiments (not depicted), hinges 110, 120, 130, and 140, respectively, may include a series of hinges mounted along the adjacent edges of keyboard housing 150 and keyboard sections 160, 170, 180, and 190, respectively, the side edges of keyboard housing 150 and keyboard sections 160, 170, 180, and 190, respectively, or a combination of the foregoing. Hinges 110, 120, 130, and 140 may be of any suitable type of hinge structure appropriate for the expected usage such as a single piano hinge, suitable protruding members and notches for receiving such members molded into the applicable edges of keyboard sections, and other hinges known to persons skilled in the applicable arts. Further, hinges 110, 120, 130, and 140, respectively, may preferably incorporate electrical signal connectors suitable for transmitting signals generated when any of the keys or the mouse pad of keyboard sections 160, 170, 180, and 190 are depressed or is utilized, respectively.

Keyboard 100 is further preferably configured to transmit a state signal to the data processing system directing the data processing system to transition between a wake mode and a sleep mode in response to a change in the extension state of keyboard 100. In the depicted embodiment, switch 240 senses a change in the extension state of keyboard 100 upon movement of hinge 120 and transmits the appropriate state signal. It is to be understood that while switch 240 is depicted as connected to hinge 100, switch 240 may be connected to any of hinges 110, 120, 130, and 140. In an alternative embodiment (not shown), switch 240 may be coupled to slider 210 and wherein responsive to the direction of movement of slider 210, the state signal contains information for directing the data processing system to transition between a wake mode and a sleep mode. Typically, the state signal contains information for directing the data processing system to transition to a wake mode upon keyboard 100 entering an extended state and to transition to a sleep mode upon keyboard 100 entering a collapsed state.

To facilitate movement of keyboard 100 between an extended state and a collapsed state, keyboard 100 may also include rolling devices. As depicted in the present embodiment, keyboard 100 includes roller 220 attached to leading edge 280 of keyboard section 170 and trailing edge 285 of keyboard section 180 and roller 230 attached to leading edge 299 of keyboard section 190. It is to be understood that rollers 220 and 230 may run the length of the trailing edges and the leading edges of the keyboard sections 170, 180, and 190, respectively, or alternatively, may include a series of rollers mounted along the adjacent edges of keyboard sections 170 and 180 and the leading edge of keyboard section 190, respectively, the side edges of keyboard 170, 180, and 190, respectively, or a combination of the foregoing.

Figure 3:
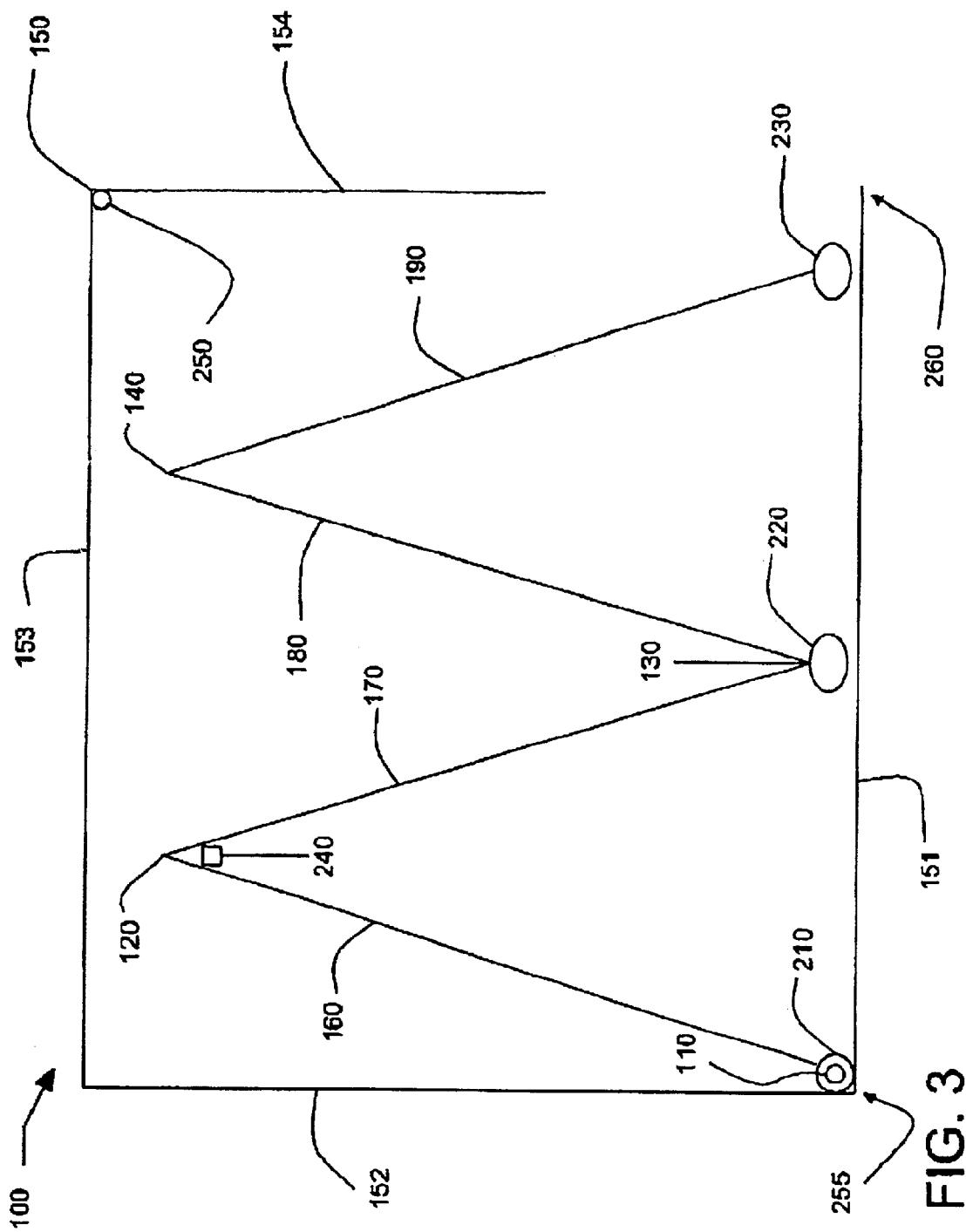
FIG. 3 is a side plan view of a keyboard according to one embodiment of the present invention depicting the keyboard in a collapsed position.

Turning to FIG. 3, keyboard 100 is depicted in a collapsed state. In the collapsed state (as depicted), slider 210 has traveled to back edge 255 of keyboard housing 150, hinges 110, 120, 130, and 140 have operatively rotated so as to permit keyboard sections 160, 170, 180, and 190 to be contained within keyboard housing 150. In one embodiment, any keys or mouse pad contained on the keyboard section closest to the front edge 260 of keyboard housing 150 remain accessible when keyboard 100 is in a collapsed state. Typically, when transitioning to the collapsed state, switch 240 transmits a state signal for directing the data processing system to transition to a sleep mode.

Figure 4:
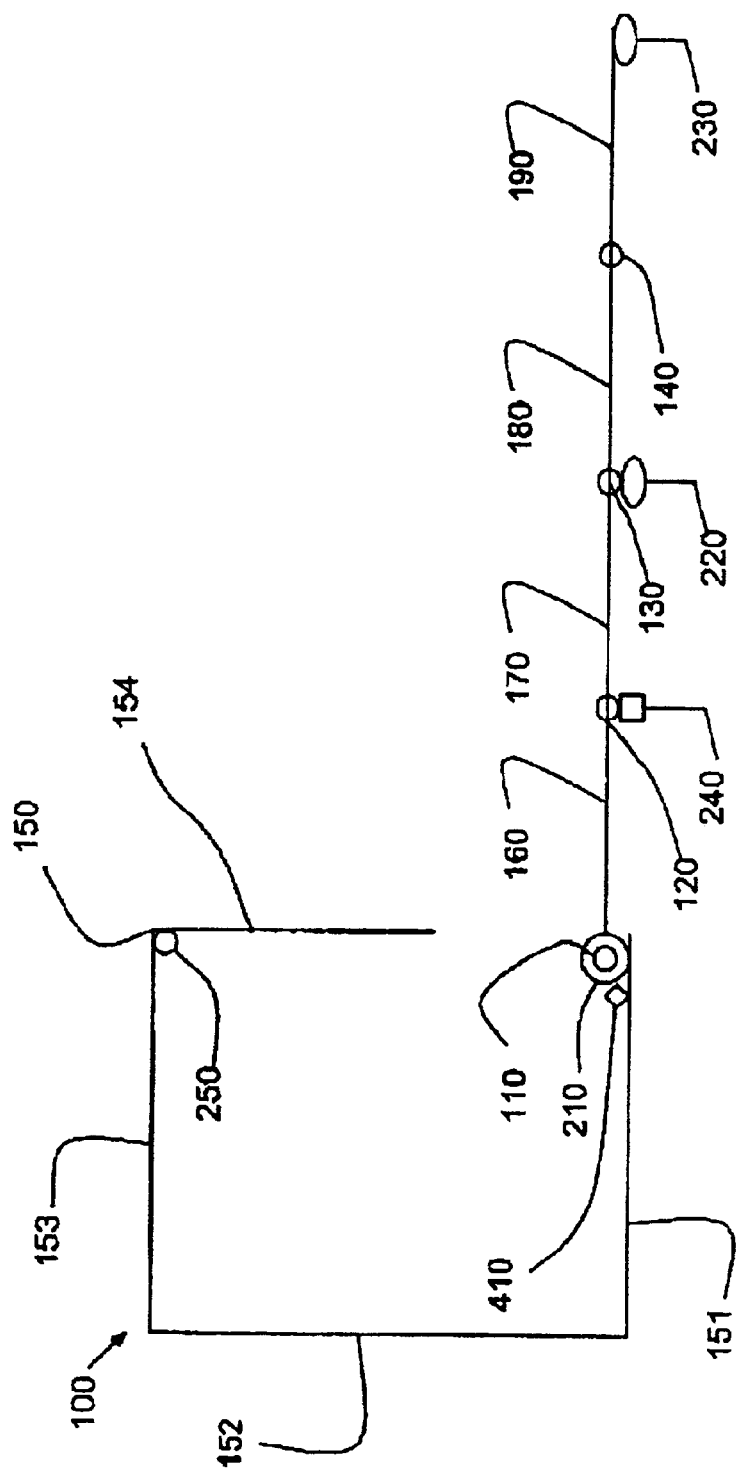
FIG. 4 is a side plan view of a keyboard according to one embodiment of the present invention depicting the keyboard in an extended position.

Turning to FIG. 4, keyboard 100 is depicted in an extended state. In the extended state (as depicted), slider 210 has traveled to front edge 260 of keyboard housing 150, hinges 110, 120, 130, and 140 have operatively rotated so as to permit keyboard sections 160, 170, 180, and 190 to be extended preferably so as to permit the keyboard to lie flat on a surface. Typically, when transitioning to the extended state, switch 240 would have transmitted a state signal for directing the data processing system to transition to a wake mode. Keyboard 100 may include lock 410 which is operatively coupled to mounting plate 151 and configured to selectively maintain keyboard 100 in an extended state or a collapsed state. In one embodiment, lock 410 may restrict movement of slider 210 so as to cause keyboard 100 to remain in an extended state. In an alternative embodiment, lock 410 may be operatively coupled to mounting plate 151 and configured to restrict movement of leading edge 299 of keyboard section 190 when leading edge 299 is inside keyboard housing 150 so as to cause keyboard 100 to remain in a collapsed state.

In yet alternative embodiments, lock 410 may include a series of locks mounted along the adjacent edges of keyboard housing 150 and keyboard sections 160, 170, 180, and 190, respectively, the side edges of keyboard housing 150 and keyboard sections 160, 170, 180, and 190, respectively, or a combination of the foregoing. Lock 410 may be of any type of suitable lock structure appropriate for the expected usage such as a pin which may extend through mounting plate 151 and which may be selectively engaged to restrict movement of slider 210; one or more pins or latches attached to keyboard housing 150 and keyboard sections 160, 170, 180, and 190, respectively, and which may be selectively engaged to couple keyboard housing 150 and keyboard sections 160, 170, 180, and 190, respectively; and other locks known to persons skilled in the applicable arts.

Figure 5:
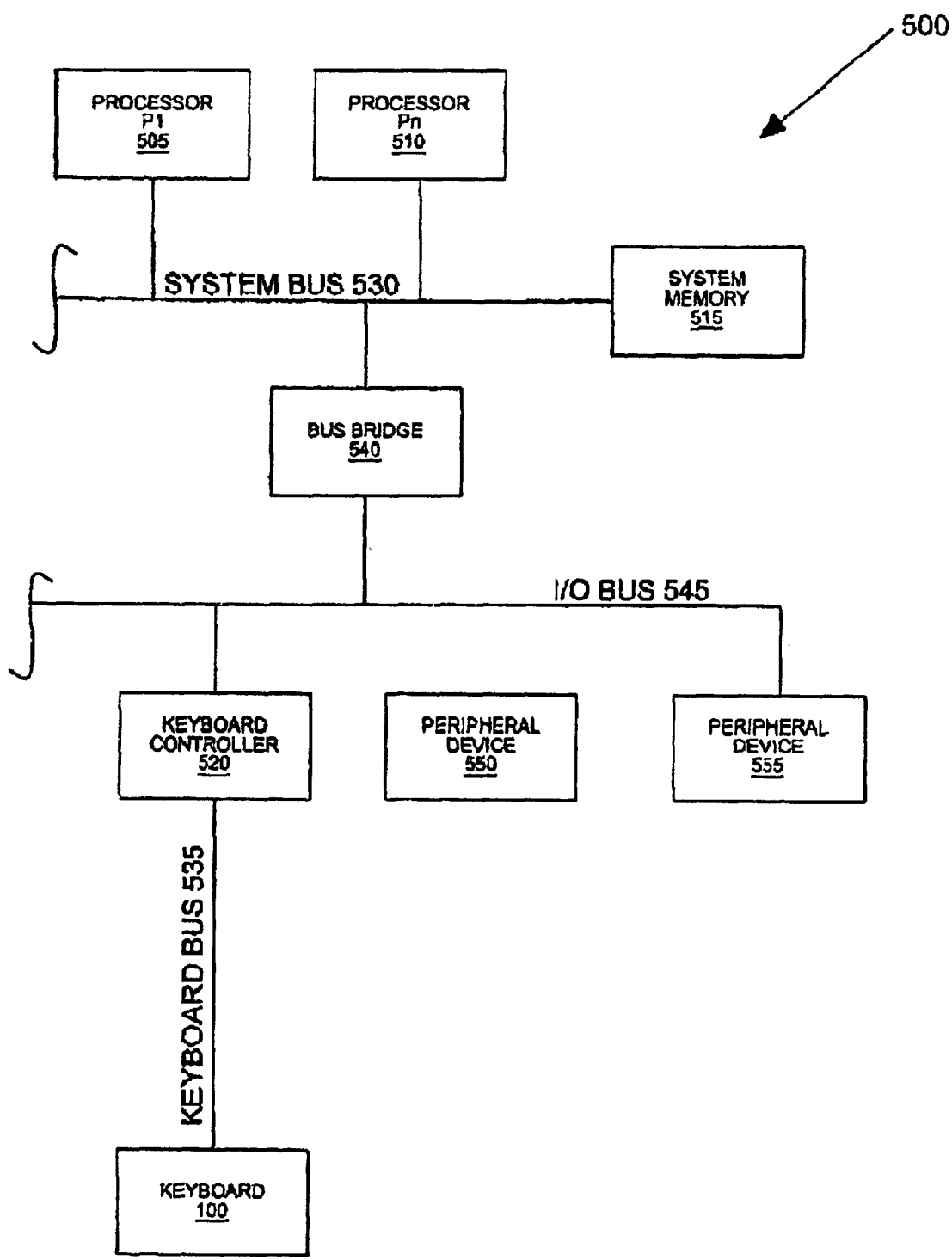
FIG. 5 depicts a data processing system including the keyboard of FIG. 1.

Turning to FIG. 5, selected features of a data processing system 500 according to one embodiment of the present invention are shown. In the depicted embodiment, data processing system 500 includes one or more processors Pl 505 through Pn 510 that are connected and have access to a system memory 515 via a system bus 530. Processors Pl 505 through Pn 510 may be implemented with any of a variety of general purpose microprocessors including, as examples, the "PowerPC" family of processors from IBM Corporation and x86 type processors such as the "Pentium" family of processors from Intel Corporation. System memory 515 is typically implemented with volatile storage elements such as an array of dynamic RAM (DRAM) components.

A bus bridge 540 provides an interface between system bus 530 and a peripheral bus 545. Peripheral bus 545 is typically implemented according to an industry standard peripheral bus protocol or specification such as the Peripheral Components Interface (PCI) protocol as specified in *PCI Local Bus Specification Rev* 2.2, from the PCI Special Interest Group (www.pcisig.org). Data processing system 500 may include one or more peripheral devices 550 and 555 connected to peripheral bus 545. These peripheral devices could include as examples, a hard disk controller, a high speed network interface card, a graphics adapter, and so forth as will be familiar to those skilled in the design of microprocessor-based data processing systems.

Data processing system 500 further includes a keyboard controller 520 connected to peripheral bus 545 and a keyboard 100 (according to the present invention) connected to keyboard controller 520 via a keyboard "bus" 535. Keyboard controller 520 is configured to receive keyboard signals from keyboard 100 via keyboard bus 535 and communicate those signals to processor(s) Pl 505 through Pn 510 via peripheral bus 545. These keyboard signals may include a "wake" signal that is generated when keyboard 100 is extended from a collapsed position and a "sleep" signal that is generated when keyboard 100 is collapsed from an extended position. In an alternative embodiment, keyboard controller 520 may be connected to system bus 530 and may be configured to receive keyboard signals from keyboard 100 via keyboard bus 535 and communicate those signals to processor(s) Pl 505 through Pn 510 via system bus 530.

Keyboard bus 535 may include a conventional PS/2 bus as is known in the art, a Universal Serial Bus, or both. Keyboard controller 520 may be implemented with or comprise a portion of a commercially distributed component such as the SuperIO chip from National Semiconductor (www.national.com). In an embodiment where either the "wake" signal, the "sleep" signal, or both are not recognized by the operating system, keyboard controller 520 may further include dedicated hardware and a driver installed in system memory 515 that permit the data processing system 500 to interpret the wake and sleep signals from keyboard 100 and instruct processors Pl 505 through Pn 510 to transition to appropriate wake or sleep modes in response to those signals.

A person skilled in the art will appreciate that as used herein, the terms "sleep" mode and "wake" mode refer to power managed state transitions entered into by a data processing system in an effort to appropriately manage power consumption requirements. So as to lower power consumption requirements, the data processing system may enter one or more levels of a "sleep" mode. Such "sleep" modes may include a "suspend" state which, when activated, may slow down the CPU clock(s), spin down applicable drive units, save the state of various applications then running, and suspend or stop other peripheral functions. "Wake" mode typically involves increasing the power consumption requirements and if applicable, "re-awakening" the data processing system to assume a typical operating state in which the CPU clocks, applicable drive units, applications, and other peripheral functions are activated.

It will be apparent to those skilled in the art having the benefit of this disclosure that the present invention contemplates a keyboard for a data processing system, the keyboard being designed to selectively assume an extended position or a space-saving, collapsed position within a keyboard housing. The keyboard is further designed to generate a state signal for directing the data processing system to transition between a wake mode and a sleep mode in response to a change in the extension state of the keyboard. It is understood that the forms of the invention shown and described in the detailed description and the drawings are to be taken merely as presently preferred examples and that the invention is limited only by the language of the claims.

What is claimed is:

1. A keyboard for a data processing system comprising:
   a plurality of keyboard sections;
   a plurality of keys attached to at least one of the keyboard sections;
   wherein the keyboard is configured to assume a first position in which at least one of the keyboard sections is extended and to assume a second position in which each of the keyboard sections are collapsed; and
   further wherein responsive to the keyboard assuming the second position, the keyboard is configured to transmit a state signal to the data processing system to transition the data processing system to a sleep mode.

2. The keyboard of claim 1 further comprising:
   at least one hinge for connecting adjacent keyboard sections.

3. The keyboard of claim 1 wherein the keys of at least one of the keyboard sections remain accessible after the keyboard assumes the second position.

4. The keyboard of claim 1 wherein one of the keyboard sections includes a palm rest.

5. The keyboard of claim 1 further comprising:
 a keyboard housing connected to one of the keyboard sections and configured to receive at least one of the keyboard sections.

6. The keyboard of claim 5 wherein the keyboard housing includes:
 abase plate; and
 a slider configured to receive the keyboard section and operatively coupled to the base plate to permit the slider to move from a front edge of the base plate to a back edge of the base plate.

7. The keyboard of claim 6 wherein the state signal is transmitted to the data processing system upon movement of the slider.

8. The keyboard of claim 7 wherein responsive to the direction of movement of the slider, the state signal contains information for directing the data processing system to transition between a wake mode and a sleep mode.

9. The keyboard of claim 1 wherein responsive to the keyboard assuming the first position, the keyboard is configured to transmit the state signal to the data processing system to transition the data processing system to a wake mode.

10. The keyboard of claim 1 wherein the keyboard includes a switch for transmitting the state signal to the data processing system.

11. The keyboard of claim 1 further comprising at least one roller attached to the keyboard for facilitating movement of the keyboard between the first position and the second position.

12. The keyboard of claim 1 wherein the keyboard includes a lock for selectively maintaining the keyboard sections in the first position and for selectively maintaining the keyboard sections in the second position.

13. An input device for a data processing system comprising:
 a keyboard having a plurality of keys;
 at least one connector attached to the keyboard and configured for folding a first portion of the keyboard against a second portion of the keyboard;
 wherein the keyboard is configured to transmit a state signal to the data processing system upon movement of the connector; and
 wherein responsive to the direction of movement of the connector, the state signal contains information for directing the data processing system to transition between a wake mode and a sleep mode.

14. The input device of claim 13 wherein the keys attached to the first portion of the keyboard remain accessible after the first portion of the keyboard is folded against the second portion of the keyboard.

15. The input device of claim 13 wherein the plurality of keys are arranged in a plurality of parallel, horizontal rows along a face of the keyboard and further wherein the at least one connector is configured to cause the first portion of the keyboard to be folded against the second portion of the keyboard horizontally along a line between adjacent rows of the keys.

16. The input device of claim 13 further comprising:
 a palm rest attached to the keyboard.

17. The input device of claim 16 wherein the first portion of the keyboard includes the palm rest.

18. The input device of claim 17 wherein the at least one connector is configured to cause the first portion of the keyboard to be folded against the second portion of the keyboard horizontally along a line between the palm rest and a row of the keys adjacent to the palm rest.

19. The input device of claim 13 further comprising:
 a keyboard housing attached to the keyboard.

20. The input device of claim 19 wherein the second portion of the keyboard includes the keyboard housing.

21. The input device of claim 20 wherein the at least one connector is configured to cause the first portion or the keyboard to be folded against the second portion of the keyboard horizontally along a line between the keyboard housing and a row of the keys adjacent to the keyboard housing.

22. The input device of claim 13 wherein the keyboard housing includes:
 a base plate; and
 a slider configured to receive the at least one connector and operatively coupled to the base plate to permit the slider to move from a front edge of the base plate to a back edge of the base plate.

23. The input device of claim 22 wherein the state signal is transmitted to the data processing system upon movement of the slider.

24. The keyboard of claim 23 wherein responsive to the direction of movement of the slider, the state signal contains information for directing the data processing system to transition between a wake mode and a sleep mode.

25. The keyboard of claim 13 wherein the keyboard includes a switch for transmitting the state signal to the data processing system.

26. The keyboard of claim 13 further comprising at least one roller attached to the keyboard for facilitating movement of the keyboard during operation of the at least one connector.

27. The keyboard of claim 13 wherein the keyboard includes a lock for selectively permitting the at least one connector to function.

28. A data processing system having a processor, a memory unit, and a keyboard, the keyboard comprising:
 a plurality of keyboard sections;
 a plurality of keys attached to each of the keyboard sections;
 wherein the keyboard is configured to assume a first position in which at least one of the keyboard sections is extended and to assume a second position in which each of the keyboard sections are collapsed;
 further wherein responsive to whether the keyboard has assumed the first position or the second position, the keyboard is configured to transmit a state signal to the data processing system; and
 further wherein the state signal contains information for directing the data processing system to transition between a wake mode and a sleep mode.

29. The keyboard of claim 28 further comprising:
 at least one hinge for connecting adjacent keyboard sections.

30. The keyboard of claim 28 wherein the keys of at least one of the keyboard sections remain accessible after the keyboard assumes the second position.

31. The keyboard of claim 28 wherein one of the keyboard sections includes a palm rest.

32. The keyboard of claim 28 further comprising:
 a keyboard housing connected to one of the keyboard sections and configured to receive at least one of the keyboard sections.

33. The keyboard of claim 32 wherein the keyboard housing includes:

abase plate; and a slider configured to receive the keyboard section and operatively coupled to the base plate to permit the slider to move from a front edge of the base plate to a back edge of the base plate.

34. The keyboard of claim 33 wherein the state signal is transmitted to the data processing system upon movement of the slider.

35. The keyboard of claim 34 wherein responsive to the direction of movement of the slider, the state signal contains information for directing the data processing system to transition between a wake mode and a sleep mode.

36. The keyboard of claim 28 wherein responsive to the keyboard assuming the first position, the state signal contains information for directing the data processing system to transition to a wake mode and further wherein responsive to the keyboard assuming the second position, the state signal contains information for directing the data processing system to transition to a sleep mode.

37. The keyboard of claim 28 wherein the keyboard includes a switch for transmitting the state signal to the data processing system.

38. The keyboard of claim 28 further comprising at least one roller attached to the keyboard for facilitating movement of the keyboard between the first position and the second position.

39. The keyboard of claim 28 wherein the keyboard includes a lock for selectively maintaining the keyboard sections in the first position and for selectively maintaining the keyboard sections in the second position.

* * * * *